June 9, 1964 C. A. WILLICK 3,136,854

UNDERWATER TELEPHONE

Filed April 16, 1962

2 Sheets-Sheet 1

INVENTOR.
CLARK WILLICK

BY Morsell + Morsell

ATTORNEYS.

June 9, 1964 C. A. WILLICK 3,136,854

UNDERWATER TELEPHONE

Filed April 16, 1962 2 Sheets-Sheet 2

INVENTOR.
CLARK WILLICK
BY Morsell + Morsell
ATTORNEYS.

United States Patent Office 3,136,854
Patented June 9, 1964

3,136,854
UNDERWATER TELEPHONE
Clark A. Willick, Waterford, Wis.
Filed Apr. 16, 1962, Ser. No. 187,756
2 Claims. (Cl. 179—1)

This invention relates to an improved underwater telephone, and more particularly to a telephone for skindivers and other underwater users which is exceedingly simple in design and operation, and relatively inexpensive in construction.

Heretofore, various types of telephone systems have been designed in an effort to provide for effective communication between skindivers, or between a diver and a boat, but all of such prior systems include complex mechanisms which are too impractical and expensive for widespread use. With this in mind, it is the general object of the present invention to provide a novel underwater telephone which is not only more workable and reliable than prior devices but which is of such simplified and economical construction that it can be manufactured and sold for a fraction of the cost of the devices presently in use.

A further disadvantage of prior underwater telephone units is that they are not completely submersible in water. With those prior units designed for skindivers, for example, in order for two divers using aqua lungs to converse with each other it is necessary for them to first transmit to a receiver-transmitter located on the surface of the water, or on land, and the message is then relayed thereby to the other diver beneath the water. Obviously this is an inefficient system, and is less satisfactory than the present direct telephone circuit between the divers. Direct circuit arrangements are available for use with deep sea diving helmets, but these telephone units are housed and protected within the helmet, of course, and are not designed for direct contact with the water, as is necessary with a telephone used by skindivers. For this reason, another important object of the present invention is to provide a novel telephone apparatus for direct communication between two divers beneath the water, which apparatus is so designed and constructed that exposure of the components to water for extended periods will not damage the same.

A more specific object of the present invention is to provide an underwater telephone apparatus for the purposes described wherein certain necessary elements such as the earphone and transmitter are protected from the water by novel, simplified waterproof housings, but wherein many other components such as the circuit connections and terminals are so designed that it is unnecessary to waterproof the same, thus providing an effective but simple and inexpensive unit which can be used in either fresh or salt water without damage to the same.

A further specific object is to provide an underwater telephone apparatus utilizing a novel earpiece which is flatter and less bulky in design than prior underwater earpieces, and therefore more comfortable and convenient for the user, but wherein the functional organs are completely covered by a protective housing to eliminate the possibility of damage from water or other cause, the unique design of said earpiece being such that said cover does not materially deaden the sound or detract from the functional qualities of the receiver.

A further specific object of the invention is to provide a novel underwater telephone apparatus utilizing a microphone which is positioned against the user's throat, said microphone being adapted to transmit through the speaker's throat vibrations and thus eliminating the necessity for the user having to open his mouth under water, as is required with prior underwater phone devices.

A further object is to provide an improved underwater telephone system wherein any number of head sets may be removably plugged into the circuit, and whereby a line or circuit of any desired length can be employed, depending on the intended use of the apparatus.

A further object of the invention is to provide an underwater telephone which is designed to permit clear communication in deep water and without interference from extraneous noises.

A further object is to provide an underwater telephone which can be utilized with any type of underwater breathing apparatus, or with any type of diving suit or equipment.

Still further objects of the present invention are to provide a novel underwater telephone apparatus which is reliable in operation, durable, inexpensive to operate, and which is otherwise particularly well suited for its intended purposes.

With the above and other objects in view, the invention consists of the improved underwater telephone, and all of its parts and combinations as set forth in the claims, and all equivalents thereof.

In the accompanying drawings, illustrating the preferred form of the invention, and wherein like reference numerals designate the same parts in all of the views.

Figures 1, 2, 3:
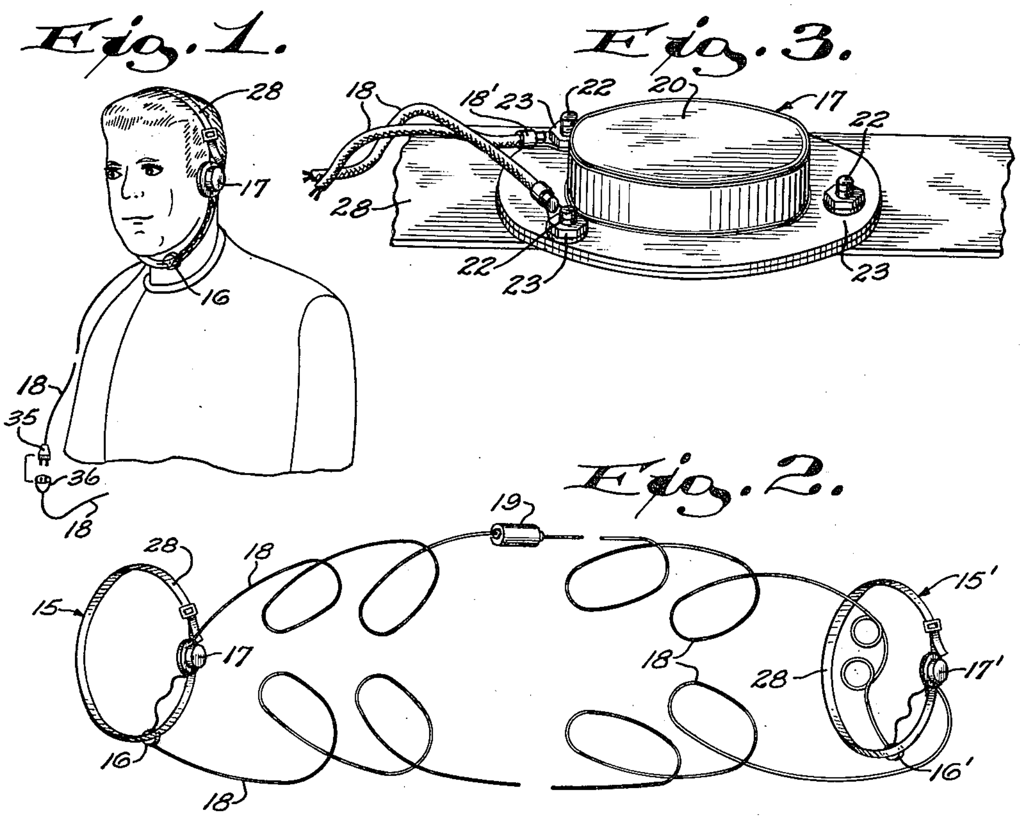
FIG. 1 is a perspective view showing a user wearing the improved head set employed in the present invention.
FIG. 2 is a semi-diagrammatic view of the complete telephone circuit.
FIG. 3 is a perspective view of the novel receiver utilized in the invention.

Referring now more particularly to FIG. 2 of the drawings, it will be seen that the complete underwater communication system comprising the present invention consists of a first headset 15 having a microphone 16 and a receiver 17, and an electric wire 18 connecting said first headset to a second headset 15' and to a battery 19. The illustrated circuit is designed to provide for underwater communication between two skindivers, or swimmers, but it is to be understood that it can also be used to provide communication between a swimmer and a boat, or with the shore. In the latter cases it is unnecessary that the transmitter and receiver in the boat or on shore be waterproof, and a conventional hand telephone may be substituted for one of the handsets, or added to the circuit. It is to be understood, too, that while the illustrated embodiment of the invention includes only two headsets, it is possible to include any number of such units in the circuit without departing from the spirit of the invention, as will be hereinafter discussed in greater detail.

As shown in the drawings, the earpiece or receiver 17 employed in the present invention is relatively flat, and is designed to be worn in covering relation to the user's ear (FIG. 1) without protruding unnecessarily. The compact nature of said earpiece is an important feature of the present apparatus as it promotes the comfort of the user and is especially advantageous when the user is wearing a cap or other head cover, as is necessary when a diver is working for an extended length of time in deep or cold water. With the present structure, in contrast to the large, bulky receivers heretofore employed with underwater phones, the diver's cap or helmet can be easily pulled over the earpiece, and there is no necessity for an expensive, specially-designed cap or helmet in order to accommodate the same.

Figure 5:
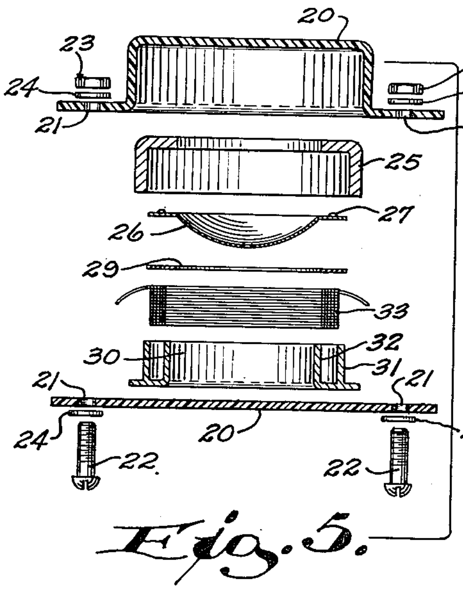
FIG. 5 is an exploded sectional view of the receiver.
Figure 4:
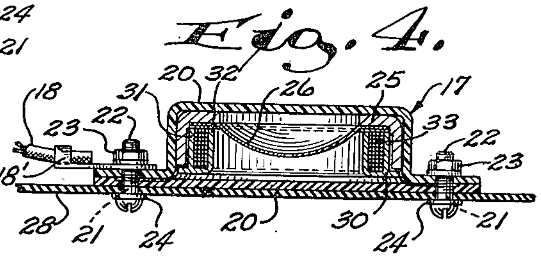
FIG. 4 is a transverse sectional view through the receiver.

As is illustrated in FIGS. 4 and 5, the complete earpiece includes a cylindrical plastic housing 20 (preferably a thermoplastic of approximately $^{80}/_{1000}''$ thickness), which housing is formed of an upper member having a cylindrical cavity therein and a separable flat lower member, said upper and lower members having several registering apertures 21 therethrough and being secured together by small bolts 22 which are projected through said registering apertures and secured by nuts 23. In the finished earpiece assemblage a solvent weld is applied between said housing upper and lower members to provide a completely waterproof bond therebetween.

Figure 6:
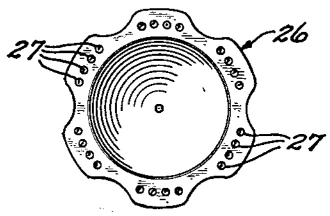
FIG. 6 is a plan view of the receiver diaphragm.

As shown in FIGS. 4 and 5, fitted within said plastic housing 20 is a cylindrical, permanent magnet 25 having an open bottom and a top with a circular opening therein. A dish-shaped aluminum diaphragm 26 is positioned within and against the underside of the magnet top surface, the outer, peripheral portion of said diaphragm being flat (FIG. 6), in contrast to the concave central portion thereof, and said diaphragm periphery having a plurality of protrusions 27 spaced thereabout which are designed to function as minute fulcrum points to accentuate the vibratory action of said diaphragm in response to the current pulsations applied thereto, as will be described.

Abutting the underside of the flat peripheral portion of the diaphragm 26 is a soft iron ring 29 of high magnetic conductivity, which ring is designed to seat on the top surface of a cylindrical steel base 30. As best appears in FIG. 5, said base has a pair of concentric, upstanding circular walls 31 and 32, and mounted in the annular space therebetween is a wire coil 33 formed of a plurality of closely wound, fine wires, said coil being connected to the cover bolts 22 (FIG. 4). The aforementioned circuit wires 18 are also connected to said bolts 22 (FIGS. 3 and 4), being clampingly retained thereon by the nuts 23, and said wires having metal end members 18' forming ring terminals which completely surround said bolts and eliminate the possibility of their being inadvertently separated therefrom. Thus there is provided a circuit connection between the battery 19, a distant transmitter 16', and the coil 33 in the earphone.

In addition to functioning both as the means for securing the separable plastic housing members together, and for providing the electrical connection between the circuit wires 18 and the receiver components within the housing, the bolts 22 also provide means for securing the earphone to the headband 28. Said headband comprises a circular band of flat, elastic material, formed of rubber or the like, and as will be seen in FIGS. 3 and 4, said bolts 22 are projected therethrough and the nuts 23 screwed thereon to clampingly secure said band to the housing. The user merely stretches the elastic band 28 around his head and under his chin (FIG. 1), and arranges the same so that the earphone is properly positioned over his ear, the mike 16 also being secured to said headband, as will be described, and being so positioned relative to the earphone that it is automatically properly located against the wearer's throat when said earphone is correctly positioned.

In the operation of the earphones or receiver 17, when a vocal sound is transmitted through the line 18 in the form of current pulsations, or frequency changes, the coil and magnet assemblage therein causes the diaphragm 26 in said earphone to vibrate accordingly and to transform said current pulsations into an audible sound again, as in a conventional telephone. The phenomenon of telephony is well known, of course, but what is believed to be novel in the present invention is the simplified design and construction of applicant's receiver, wherein the functional members are not only reduced both in number and size, as compared to most prior underwater receivers, but wherein said functional members are encased in a compact housing which protects the same from the water without dampening or muffling the sound. Most prior underwater earpieces have been large, bulky devices, as descrbed, in order to obtain sufficient air space on the opposite sides of the diaphragm, and such prior devices are uncomfortable and inconvenient for the wearer. Moreover, in those receivers wherein it is attempted to obtain compactness, the size reduction is obtained by positioning the diaphragm closely adjacent at least one of the housing walls, and the resulting relatively small air space therebetween inhibits the vibration of said diaphragm and causes a dampening or deadening of the sound.

As is shown in FIG. 4, the diaphragm 26 in the present invention is positioned in the approximate middle of the housing 20, with the result that there is a relatively substantial air space between said diaphragm and the opposite walls of the housing. The central positioning of said diaphragm, together with its semi-spherical contour, permits said diaphragm to vibrate fully and without hindrance within the compact housing, and results in unusual clarity of sound. Moreover, because of the unique design and mounting of said diaphragm, the resulting sounds are transmitted more or less evenly over the entire surface area of the housing, thus further promoting the audibility of the present unit. These improved characteristics of the earpiece incorporated in the present invention are very critical features of the invention, and their importance cannot be over-emphasized.

Figure 7:
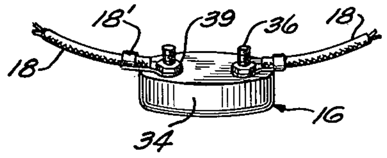
FIG. 7 is a perspective view of the throat-type microphone employed in the present invention.
Figure 8:
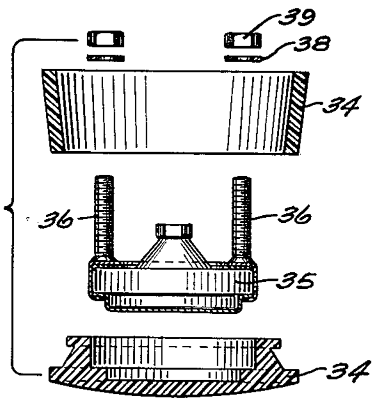
FIG. 8 is an exploded view of the microphone, parts thereof being shown in section.
Figure 9:
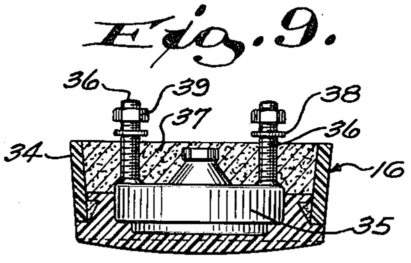
FIG. 9 is a sectional view of the throat microphone in assembled condition.
Figure 10:
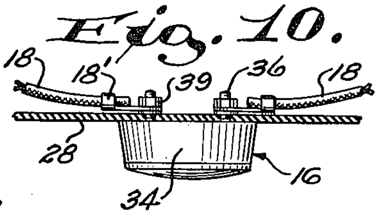
FIG. 10 is a sectional view through the headband, showing the microphone attached thereto.

With reference now to FIGS. 7 through 10 it will be seen that the throat-type microphone 16 forming the transmitter in the present invention is contained in a small, cup-like plastic housing 34, and includes a carbon button transmitter 35. Soldered to said carbon button and projecting upwardly therefrom, are a pair of spaced, threaded metal contact posts 36, and in the assembled unit a refractory insulating material 37 (FIG. 9) is formed in the plastic housing in surrounding relationship to said carbon button. The threaded upper ends of said posts 36 project above the housing 35, and as shown in FIGS. 7 and 10, the circuit wire ring terminals 18' are clampingly engaged thereon by nuts 39, thus forming a circuit between said transmitter and the battery. Not only do said posts 36 thus function as electrical contacts between the battery and the mike, but as shown in FIG. 10, they also function to secure said throat mike to the elastic headband 28.

In the operation of the transmitter 16 in the present invention, the user positions the mike against his throat as described, and when he speaks the resulting throat vibrations exert a varying pressure on the carbon granules in the button. This change in pressure produces a change in the resistance of the carbon granules which alters the current passing therethrough. Said electric current variations are then transmitted through the wires 18 to a distant receiver 17 and are transformed thereby into an audible sound again, as described.

While throat-type microphones and carbon button transmitters are not novel per se, it is believed that the use of the same is a new innovation in underwater telephones. The advantage of the present device over a conventional microphone of course, is that the speaker does not have to open his mouth under water, it being necessary to merely form the words with the vocal chords.

Figure 11:
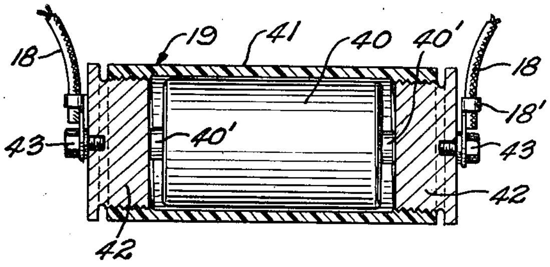
FIG. 11 is a sectional view through the waterproof battery case.

With reference now to FIGS. 2 and 11 of the drawing illustrating the battery unit 19 employed in the present invention, preferably a 9 volt, transistor battery 40 is used, although the exact size and type is not critical and any comparable battery of from 6 to 18 volts will perform satisfactorily. As illustrated in FIG. 11, said battery 40 is housed in a cylindrical plastic casing 41, said casing having internally threaded end portions and there being end plugs 42 formed of aluminum or similar rust-free conductive material screwed therein to provide a watertight closure. Said metal end plugs 42 are designed to abut the battery poles 40', and are provided with exterior screws 43 to which the ring terminals 18' at the ends of the circuit wires 18 are secured, said metal end plugs acting as conductors between the battery and said circuit wires.

It has been found that the open, uncovered circuit connections provided by the novel battery case end members 42, as well as the other simple, open terminals and connections in the line, perform excellently, and there is no necessity for providing expensive, waterproof protective coverings for the same, is in prior underwater phones. Nor is there any appreciable loss or drain of current with such open connections. On the contrary, it has been found that the simplified circuit characterizing the present invention transmits sufficient current to permit clear communication between swimmers 100 feet apart, or even further.

As shown in FIG. 1, the circuit line 18 in the present invention is a conventional, two-wire, insulated electric cord, and the headsets are merely plugged into the same, the ends of the main cord and the headset cord being provided with mating plugs 35 and 36. Thus, it will be seen that extra lengths of cord can be easily added to the line if necessary, and, in addition, multiple sockets can be employed and as many headsets or hand phones plugged into the line as desired.

From the foregoing it will be seen that the phone apparatus comprising the present invention not only has several functional advantages over prior under-water phones, but it is of such simplified and economical construction that it can be manufactured and sold for a fraction of the cost of the devices presently in use.

It is to be understood, of course, that the present invention is not to be limited or confined to all of the exact structural details illustrated and described herein. The essence of the invention is the provision of an underwater phone system substantially as shown, but it is appreciated that various changes or modifications will undoubtedly occur to those skilled in the art, and all of such changes or modifications are contemplated as may come within the spirit of the invention and within the scope of the following claims.

What I claim is:

1. In an underwater telephone system, the combination comprising: a headset including a headband adapted to fit around a wearer's head; a compact earphone receiver positionable against the user's ear, said receiver having a permanent magnet, a diaphragm adjacent said magnet, an iron member adjacent said diaphragm, and a wire coil adjacent said iron member, said coil having a pair of lead wires; a two-piece waterproof plastic cover completely encasing said receiver; a plurality of bolts securing said plastic cover pieces together and securing the same to said headband, said coil lead wires being connected to said cover bolts; an insulated circuit cord including a pair of wires connected to said earphone cover bolts, said bolts providing electrical circuit connections between said circuit wires and said coil; a microphone having a transmitter and a pair of contact posts on and projecting from said transmitter; a plastic cover surrounding said transmitter, said contact posts projecting from said cover and securing said microphone to the headband, the circuit cord wires being connected to said contact posts; a battery connected to said circuit cord; and second transmitting and receiving means connected to said circuit cord.

2. In an underwater telephone system, the combination comprising: a headset including an elastic headband adapted to fit around a wearer's head and under his chin; a compact earphone receiver positionable against the user's ear, said receiver having a cylindrical permanent magnet, an aluminum diaphragm adjacent said magnet, an iron ring adjacent said diaphragm, and a wire coil adjacent said ring, said coil having a pair of lead wires; a two-piece, rigid waterproof plastic cover completely encasing said receiver; a plurality of bolts securing said plastic cover pieces together and securing the same to said elastic headband, said coil lead wires being connected to said cover bolts; an insulated circuit cord including a pair of wires connected to said earpiece cover bolts; plug type connections in said circuit cord; a throat-type microphone having a carbon button transmitter and a pair of threaded contact posts on and projecting from said transmitter; a plastic cover surrounding said transmitter, said contact posts projecting from said cover and securing the same to said elastic headband in a position relative to said earphone whereby said microphone will be positioned against a user's throat when the earphone is over his ear, the circuit cord wires being connected to said contact posts; a waterproof battery case including a cylindrical plastic tube having internally threaded end portions and a pair of metal end members threaded therein, said circuit wires being connected to said metal end members; a battery in said battery case, the battery poles engaging said case metal end members, said end members forming electrical circuit connections between said battery and the circuit wires; and second transmitting and receiving means connected to said circuit cord.

References Cited in the file of this patent

UNITED STATES PATENTS

| | | |
|---|---|---|
| 2,255,249 | Greibach | Sept. 9, 1949 |
| 2,889,401 | Finkbeiner | June 2, 1959 |
| 2,978,669 | Harris | Apr. 4, 1961 |
| 3,064,089 | Ward | Nov. 13, 1962 |
| 3,076,174 | Wainwright et al. | Jan. 29, 1963 |